Jan. 23, 1934.   W. O. TAIT, JR   1,944,700
STEERING MECHANISM, ETC
Filed Nov. 27, 1931   4 Sheets-Sheet 1

Inventor
William O. Tait, Jr.,
By
Attorney

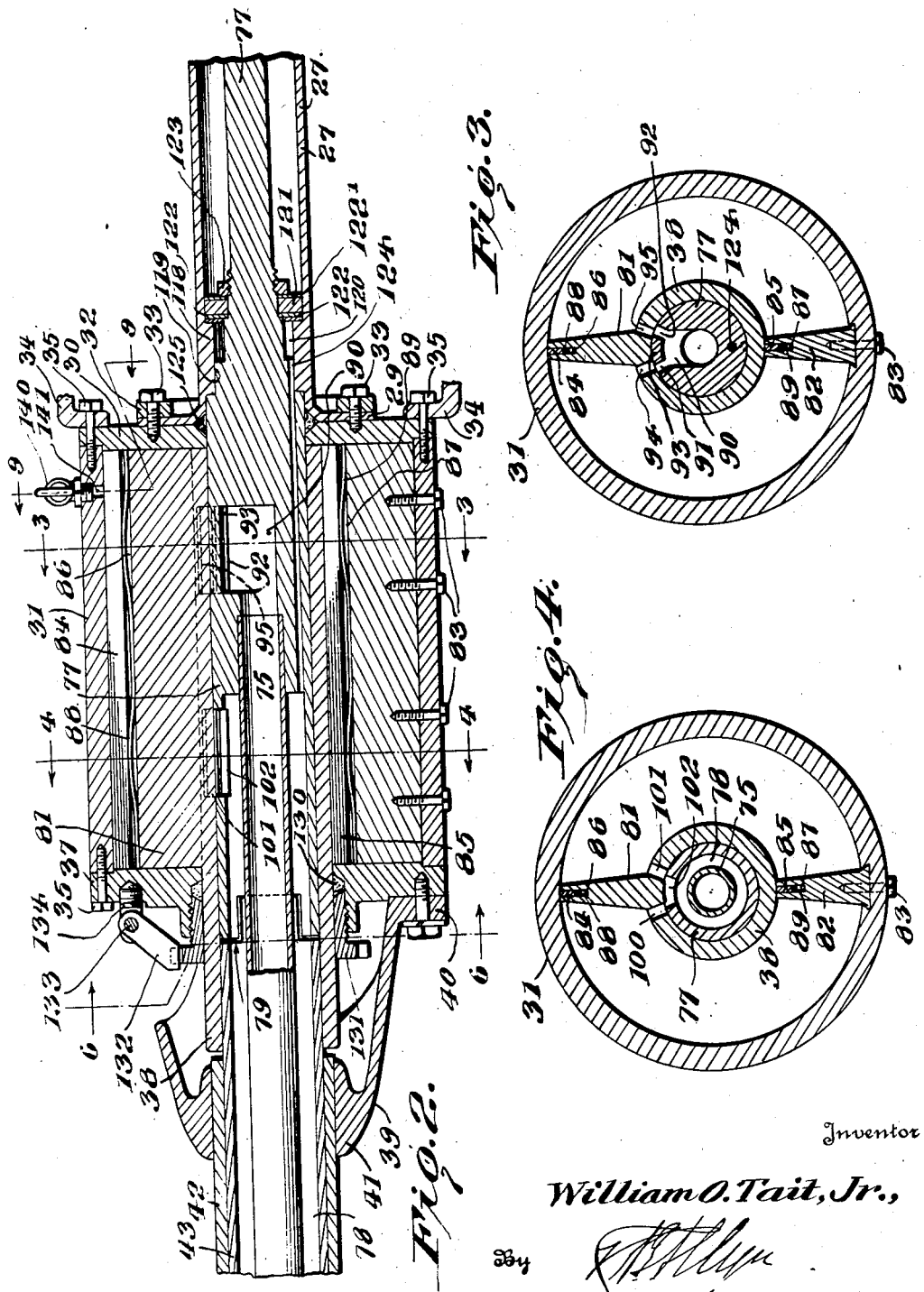

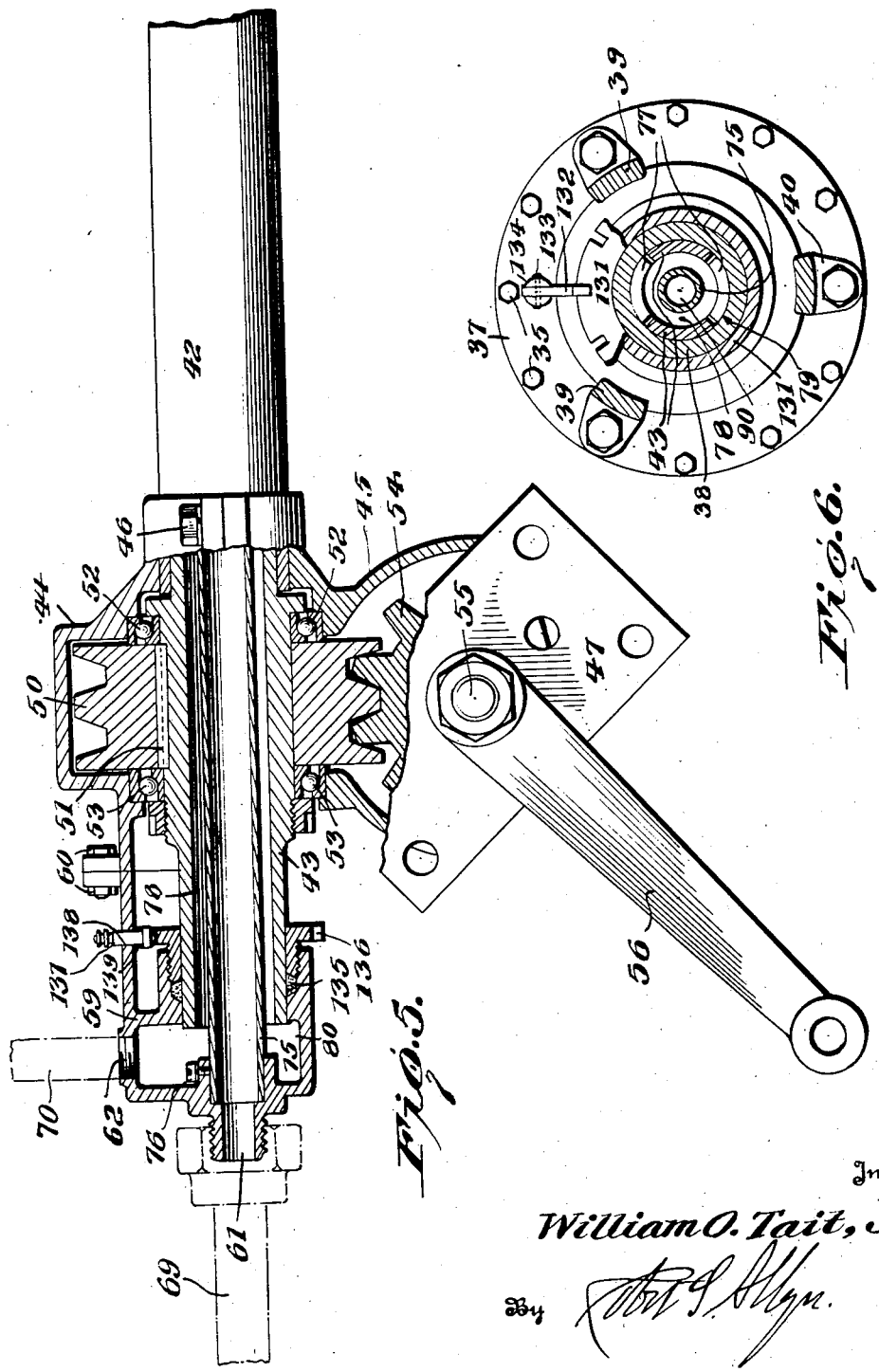

Jan. 23, 1934.  W. O. TAIT, JR  1,944,700
STEERING MECHANISM, ETC
Filed Nov. 27, 1931  4 Sheets-Sheet 4
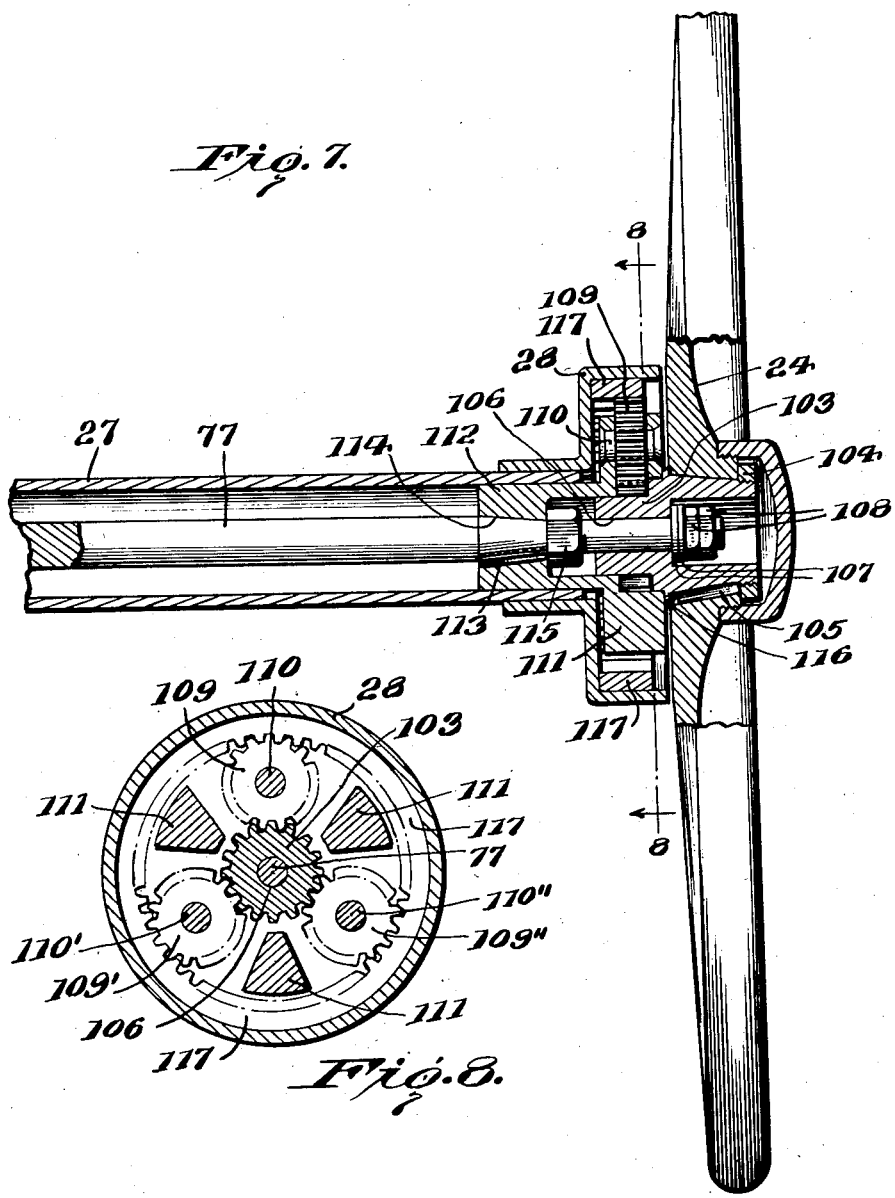
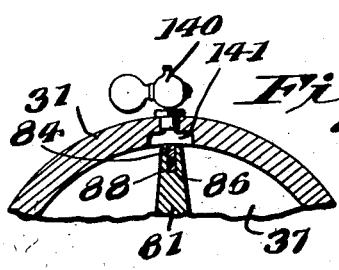
Inventor
William O. Tait, Jr.
By
Attorney Patented Jan. 23, 1934

1,944,700

UNITED STATES PATENT OFFICE 1,944,700

STEERING MECHANISM, ETC.

William O. Tait, Jr., Crestwood, N. Y.

Application November 27, 1931
Serial No. 577,531

5 Claims. (Cl. 180—79.2)

My invention relates to improvements in steering mechanisms for motor vehicles, boats and the like and more particularly to such mechanisms wherein the power required to actuate them is supplied by liquid under pressure, as in the case of my co-pending application Ser. No. 494,916 filed November 11, 1930.

One object of this invention is to provide a steering mechanism in which the force necessary to perform the turning operation is directly supplied by the liquid under pressure from a pump or other suitable source controlled by manual operation of the usual steering wheel or tiller.

Another object is to provide a construction which will permit full control of the steering apparatus with a minimum amount of physical effort on the part of the operator.

Another object is to provide for automatic reversion to manual control of the steering apparatus in the event of failure of the hydraulic pressure from any cause.

Another object is to provide a construction which will permit free circulation of the liquid at all times except when it is desired to utilize pressure in the power unit for steering purposes, and yet make that pressure effective in the desired direction when the steering wheel is given a slight angular displacement comparable to the usual "lost motion" in manually operated steering mechanisms in the same direction that the usual steering wheel would be rotated.

Another object is to provide a power steering mechanism which is simple, rugged, inexpensive and easily applicable to existing vehicles or vessels.

Other objects and advantages of the invention will be apparent as this specification proceeds.

In my present improvement I provide a circulating pump to furnish liquid under pressure to a stationary cylinder mounted on a sectional steering shaft. The cylinder has within it a fixed stator blade and a rotor blade or piston carried on the upper end of the lower or power shaft section. The upper or control shaft section is rotatable by means of reducing gearing operated by a hand wheel of the usual type and engages the power shaft through a lost motion clutch. Valve mechanism actuated by the control shaft from the steering wheel controls the circulation of the liquid and the distribution of hydraulic pressure between the stator and rotor blades in the cylinder.

Pressure on the rotor blade causes it to rotate the lower power shaft and a worm gear carried on the power shaft translates this motion to turn the vehicle wheels through the usual quadrant gear. The principal gear reduction however is between the hand wheel and the control shaft instead of at the worm gear.

Fig. 2 is a longitudinal section of the motor unit.

Fig. 3 is a cross section of the motor unit on the line 3—3 of Fig. 2.

Fig. 4 is a cross section of the motor unit on the line 4—4 of Fig. 2.

Fig. 5 is a longitudinal section of the lower end of the steering mechanism showing liquid inlet and outlet connections.

Fig. 6 is a cross section on the line 6—6 of Fig. 2.

Fig. 7 is a longitudinal cross section of the steering wheel end of the shaft.

Fig. 8 is a cross section on the line 8—8 of Fig. 7.

Fig. 9 is a partial cross section on the line 9—9 of Fig. 2.

Figure 1:
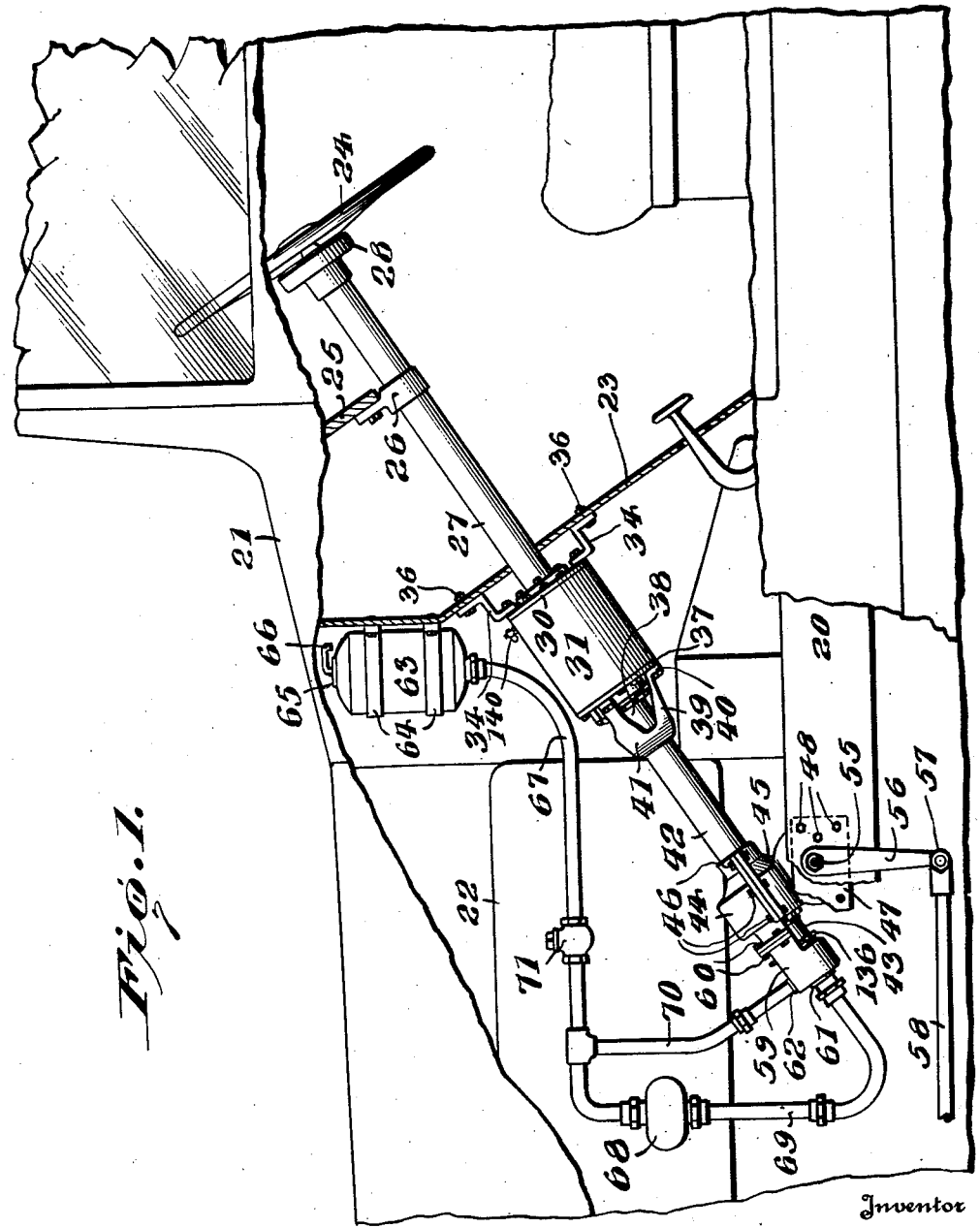
Fig. 1 is a side elevation of a steering device embodying the present improvement as applied to a motor vehicle.

In the installation illustrated my device is applied to a motor vehicle having a chassis frame 20 and body 21, driven by a motor 22 which is separated from the driver's compartment by the partition 23.

The steering wheel 24 is shown in its normal location in rear of the instrument board 25 and the latter carries a collar brace 26 in which the hollow steering shaft casing 27 is supported.

At the upper end of the casing 27 below the steering wheel and rigidly secured to the casing is a gear casing 28 containing a planetary gear connection between the steering wheel and steering column which will be described in detail later in this specification and shown in Figs. 7 and 8.

The lower end of the casing 27 is flanged outward to form a footing 29 rigidly connected to the upper cylinder head 30 of the power unit cylinder 31 by a clamping ring 32 and bolts 33.

The casing 27 is passed through the floor plate 23 in the usual manner and the assembly secured thereto in any suitable manner as for instance by the brackets 34 connecting the cylinder head 30 to the floor plate and secured by studs 35 and bolts 36.

The lower end of the power unit cylinder 31 is closed by the lower head plate 37 through which passes the bearing end of the rotor member 38 (see Fig. 2).

A tripod brace 39 has its feet 40 secured to the outer face of the cylinder head 37 and a collar 41 below the head surrounding a casing 42 which surrounds and maintains the hollow power shaft 43 in co-axial alignment with the power unit cylinder.

At the lower end of the casing 42 is a worm gear housing comprising an upper sector 44 and a lower sector 45, held together by bolts 46. The lower sector is extended to form a quadrant housing and is secured to the chassis frame 20 by the base plate 47 and bolts 48.

Within the housing 44—45 as will be seen in Fig. 5 are contained the double threaded worm gear 50 keyed at 51 to the power shaft 43, held in longitudinal position by the thrust bearings 52 and 53; the steering arm quadrant 54 in engagement with the worm 50 and the quadrant pinion 55. One end of the pinion 55 extends outward through the base plate of the housing and the chassis frame and is adapted to receive one end of the steering arm 56 in fixed relation thereto. The opposite end of the arm 56 is hinged at 57 to the steering reach rod 58 which controls the front wheels of the vehicle by the usual means (not shown.)

To the lower end of the housing 44 is connected the liquid distributing chamber 59 secured by bolts 60, having a liquid inlet 61 and outlet 62.

Liquid for operating the system may be supplied from a reservoir such as 63 which is shown secured to the partition 23 by clamping bands 64, 64, being provided with a filling plug 65 and an air vent with a downward projecting opening such as 66.

The bottom of the reservoir has a pipe connection 67 which leads to a suitable gear pump 68 driven in any suitable manner (not shown) the discharge outlet of the pump being connected by the pipe 69 to the inlet opening in the liquid distribution chamber 59.

The outlet opening of the chamber 59 is connected to the pipe 67 by the pipe 70 so that liquid leaving the chamber is returned to the intake side of the pump.

When the system is full of liquid and in working order there will be very little additional liquid required to replace possible losses due to leakage, and in order to furnish this from the reservoir and at the same time prevent liquid under pressure from backing up into the reservoir, a check valve 71 is interposed in the pipe 67 between the reservoir and the connection to the liquid discharge line 70. This purpose might be served by other means (not shown) such as a hand pump in the reservoir similar to those commonly employed to feed oil to hydraulic brake systems.

In line with the inlet 61 and leading upward from it is the pressure pipe 75, the lower end of which is seated in the lower end wall of the liquid distributing chamber 59 surrounding the inlet, co-axial with the power tube 43 and held from shifting or turning by the set screw 76.

The upper end of the pressure pipe is seated in a cylindrical bearing socket within the lower end of the control shaft 77. The outside diameter of that portion of the control shaft which passes through the power unit 31 is the same as that of the power tube 43 and it is bored, as far up as the lower end of the socket bearing for the pressure pipe, to the same inside diameter as that of the power tube, forming a continuous annular discharge passage 78 around the outer surface of the pressure pipe. The lower end of the control shaft engages the upper end of the power tube within the bearing end of the rotor 38 by means of a straight thrust clutch 79 which has a slight amount of angular play to allow for a small initial rotation of the control shaft independent of the power shaft as shown in Fig. 6.

The power shaft is prevented from shifting longitudinally by the thrust bearings 52 and 53, and its lower end lies just within the discharge passage 80 in the liquid distributing chamber 59.

The motor unit within the cylinder 31 comprises the rotor 38 having a radially extending blade 81 and a stator blade 82. The rotor column is carried on the control shaft and welded or otherwise rigidly secured to the upper end of the power shaft. The rotor blade extends from the outer side of the rotor column to the inside surface of the power cylinder between the inside faces of the upper and lower head plates 30 and 37. The rotor blade edges just clear the cylinder walls except at the lower side of the cylinder where the stator blade acts as a stop.

The stator blade is suitably secured to the cylinder wall and may be key seated and secured by bolts 83 as shown in Figs. 2 and 3. The inner longitudinal edge just clears the outer cylindrical wall of the rotor column and the ends fit closely against the cylinder heads.

In order to prevent leakage of liquid past the longitudinal edges of the rotor and stator blades, valve strips 84 and 85 are mounted in grooves 86 and 87 respectively and pressed against the adjacent surfaces by springs 88 and 89.

The control shaft 77 is provided with a chamber 90 communicating with the upper end of the pressure pipe 75. On the side toward the rotor blade this chamber is extended outward to longitudinal ports 91 and 92 separated by a blank bridge 93 in the outer surface of the control shaft. Ports 94 and 95, longitudinally co-extensive with the ports 91 and 92 are cut through the rotor column at the base of the rotor blade on opposite sides thereof. When the control shaft and rotor are in neutral position as shown in Fig. 3 the angular relation of the ports 91, 92, 94 and 95 is such that the inner or adjacent halves of ports 91 and 92 register with the outer halves of the ports 94 and 95 respectively throughout their entire length.

Discharge ports 100 and 101 are cut through the rotor column in longitudinal alignment with ports 94 and 95 respectively but below them and also below the upper end of the discharge passage 78, with which they communicate through the port 102 cut in the outer wall of the control shaft and longitudinally co-extensive with them. The port 102 is in line with the bridge 93 between the ports 91 and 92.

When the rotor and control shaft are in neutral angular position with respect to each other, one-half of the width of each of the ports 100 and 101 will register with the outer portions of the opening of the port 102 throughout their entire length.

The lost motion in the clutch 79 is just sufficient to allow the control shaft to be rotated within the rotor through an angle which will cause the inlet ports on one side of the rotor blade to register throughout their width and close the other inlet ports, at the same time opening the discharge port on the opposite side of the rotor blade to its full width and closing the aligned discharge port.

The upper portion of the control shaft extends through the casing 27 to the steering wheel, by which it is moved through a planetary gear train as illustrated in Figs. 7 and 8.

The steering wheel 24 is secured to the sun gear pinion 103 by the nut 104 and held from turning thereon by the key 105. The gear 103 is mounted on a bearing 106 formed on the upper end of the control shaft, on which it is retained by washers 107 and nuts 108.

The sun gear meshes with three planetary gears 109, 109', 109" rotatable on bearing pins 110, 110', 110" radially disposed at 120° intervals and carried in a ring mounting 111 which is rigidly connected to the control shaft by the lower extension 112 keyed at 113 and held against a conical seat 114 by the nut 115. The extension 112 has a rotating bearing in the sleeve 27. The pinion gear 103 has a collar 116 bearing against the ring 111 to hold the gears in transverse alignment and prevent the end of the pinion from striking the nut 115.

The planetary gears engage a ring gear 117 held rigidly in the housing 28 which in turn is welded to the casing 27, and forms a fulcrum for turning the control shaft by rotation of the steering wheel. The gear ratio shown is such that about 3½ turns of the steering wheel are necessary to cause a full rotation of the control shaft, but this ratio may be changed as desired by appropriate changes in the sizes of the sun and planetary gears.

A collar 118 is provided in the lower end of the shaft 27 which forms an upper thrust bearing for the outer portion of the control shaft and a cylindrical bearing for an upward extending shoulder 119 on that shaft. Above this shoulder the diameter of the control shaft is somewhat reduced, forming an annular leakage chamber 120 between the bore of the collar 118 and the outside of the shaft.

This chamber is closed at the top by packing 121 held in place by washers 122, 122' and nut 123 surrounding the shaft, so that the packing forms a liquid tight joint within the casing 27. A drain groove 124 formed in the under side of the control shaft connects the chamber 120 with the liquid discharge passage 78. Any liquid under pressure which may leak between the collar 118 and shoulder 119 will be returned to the system through the chamber 120 and groove 124. Packing 125 between the cylinder head 30 and casing footing 29 around the outer surface of the control shaft serves to reduce such leakage to a minimum.

In the lower cylinder head, leakage is prevented between the rotor bearing and the head opening by packing 130 held in place by the packing gland spanner nut 131. This nut may be retained in any desired angular position by the dog 132, hinged at 133 to the stud 134 in the head, by bringing one of the spanner slots into engagement with the lower end of the dog as shown in Fig. 6.

Similarly, leakage between the outside of the power shaft 43 and the discharge chamber 80 is prevented by packing 135 in the upper end of the liquid distributing chamber 59, under pressure from the packing gland spanner nut 136. The angular displacement of this nut is prevented by the dog 137 sliding through a bearing hole 138 in the outer wall portion of the chamber and held in engagement with one of the spanner slots by the spring 139.

A pet cock 140 is connected with the interior of the power cylinder 31 by the duct 141 on the upper side of the upper end to provide means for liberating any air which may become trapped in the system. The duct 141 is made wide enough to extend beyond the right and left faces of the rotor blade 81 when the latter is in the vertical position shown in Fig. 9 so that air can then be vented from both sides of the power unit chamber.

The proportions of the worm 50 and quadrant gear 54 are such that the vehicle wheels will reach their extreme limits of angular displacement to right or left when the rotor blade comes in contact with the stator blade on the right or left side respectively of the latter.

The system may be filled with oil such as is used in hydraulic brake systems or any other liquid which will not freeze at ordinary winter temperatures nor corrode the working parts, by bringing the rotor blade into the vertical neutral position shown in Figs. 3 and 4, opening the pet cock 140, filling the reservoir 63 with the liquid selected and starting the pump 68.

The liquid will flow down the pipe 67, passing the check valve 71, through the pump 68, delivery pipe 69, inlet 61, pressure pipe 75 and chamber 90, thence through ports 91 and 94 into the left side of the cylinder chamber and through ports 92 and 95 into the right side thereof, filling the cylinder 31 on both sides of the rotor blade, and driving out air through the pet cock 140, which should be partly closed when oil starts to run out of it, and fully closed when no more air issues from it.

The liquid will pass from the cylinder through the ports 100 and 101 into the port 102 and passage 78 to the chamber 80, outlet 62 and pipe 70 to its connection with the pipe 67 and thence to the inlet side of the pump 68, completing the pump circuit, and prevented from returning to the reservoir 63 by the check valve 71.

The correct position of the rotor blade for filling may be attained by placing the steering wheel in position for driving straight ahead and equalizing the lost motion in the clutch 79 so that the spaces between the clutch teeth will be approximately uniform, allowing the ports on both sides of the rotor to be open from the pressure pipe and to the discharge tube.

The system being thus prepared, the liquid continues to circulate through the course indicated with the drop in pressure between the discharge and inlet sides of the pump being only that due to frictional resistance in the circuit.

If it is desired to effect a left turn of the vehicle, the steering wheel 24 is turned to the left in the normal manner, turning with it the sun gear 103 which causes the planetary gears 109, 109' and 109" to revolve around it in the same direction within the ring gear 117, thereby turning the planetary gear ring 111 and the attached control shaft 77 through an angle about one third of that traversed by the wheel 24.

When the control shaft has turned to the left far enough to take up the left hand lost motion in the clutch 79, the control shaft engages the power shaft 43. At the same time the port 92 is rotated into full lateral registry with the port 95, the port 94 is closed by the blank bridge 93, the port 102 affords full opening for the port 100 and the port 101 is closed by the lower cylindrical wall of the control shaft.

Liquid under pump discharge pressure is now constrained to flow through the ports 92 and 95 into the power cylinder chamber on the right side of the stator 82 from which it cannot escape because the port 101 is closed, and the pressure rises almost at once to the upper limit of the pump capacity, tending to force the rotor blade to the left and away from the right side of the stator. At the same time liquid on the left side of the stator is permitted to pass out of the left side of the power cylinder through the ports 100 and 102 into the discharge passage 78 and thence back to the intake side of the pump, thereby decreasing the pressure on the left side of the rotor blade. The rotor blade is moved to the left under the differential pressure on its right side, thereby moving the rotor column 38 and the power shaft 43 in a counter-clockwise direction.

The worm gear 50 being fast on the power shaft turns with it and actuates the quadrant 54 driving the pinion 55 and arm 56 to give longitudinal motion to the hinge 57 and reach rod 58 to turn the front wheels of the vehicle to the left.

As long as the left hand turning of the steering wheel is continuous the action of the rotor on the power shaft 43 is added to whatever manual force may be exerted thereon through the medium of the steering wheel, control shaft and clutch 79.

As soon as the counter-clockwise turning of the steering wheel is arrested the control shaft stops rotating, but the rotor blade continues to move through a very slight angle which is all that is required to open a passage between the inlet ports 91 and 94 and simultaneously between the discharge ports 101 and 102. The liquid on opposite sides of the rotor then tends to equalize in pressure and when equalized the clutch 79 is disengaged and the stator is in neutral position with respect to the control shaft, allowing the liquid to circulate as before.

If it is desired to turn the vehicle wheels to the right, the steering wheel is moved in a clockwise direction and by similar interaction of the entrained gears the control shaft rotates clockwise, engages the power shaft 43 at the clutch 79, opens the ports 91, 94 and 101, closes ports 95 and 100 and causes pressure to build up in the cylinder on the left side of the stator between it and the rotor while the presure on the right side of the stator is relieved. The rotor then moves in a clockwise direction, carrying with it the power shaft and worm gear, so that the reach rod moves the wheels in the proper direction through the means provided as previously described. As soon as the steering wheel motion is arrested, the rotor moves to neutral position, the hydraulic pressure is equalized and the apparatus is ready for the next turning movement.

Since the liquid is practically incompressible, the response of this device to the governing control of the steering wheel is instantaneous, and since manual power is supplemented almost entirely by the pressure exerted by the liquid in the cylinder, very little effort is required on the part of the driver to effect ordinary turning movements, while the difficulty ordinarily experienced in turning wheels having wide tread tires while the vehicle is standing is practically overcome. Steadiness in steering while running is increased by the dash-pot action of the rotor blade surrounded by the liquid in the power cylinder.

In case the hydraulic pressure should fail for any reason, full manual control of the steering mechanism is automatically afforded by the clutch 79 connecting the control shaft and the power shaft. The small amount of lost motion in the clutch allows a certain amount of play in the steering wheel, which is comparable in extent to that found in direct acting manual steering gears of the type now commonly in use, and is insufficient to constitute a menace to safe guidance of the vehicle.

The device contains few moving parts and is simple in its operation. No special training is required to enable a person accustomed to ordinary manual steering to use it with accuracy and safety without the expenditure of more than a fraction of the physical effort required for manual operation. The most notable difference in the force required to turn the steering wheel will be found when the vehicle is not moving and it is desired to make a sharp turning movement, as, for instance, when turning out from a curb where other cars are parked closely in front and to the rear.

While this device is herein illustrated and described as applied to the control of vehicle steering by the action of a liquid under pressure, it can be employed with similar effectiveness to cause the movement of other mechanisms, such as the steering of boats, the training of artillery, search-lights, etc., and wherever more power is required than can be furnished by normal manual effort.

It will thus be seen that I have provided a simple and positive means for the utilization of hydraulic power in steering operations, with supplemental manual power if desired and full manual control instantly and automatically available in the event of failure of the power supply without any adjustment or change of position on the part of the operator.

It should be understood however that the invention is not limited to the details herein shown except as required by the prior art and the terms of the claims.

I claim:

1. In a vehicle steering device, a liquid container, a pump, an intake pipe connecting said container with said pump, a fixed cylinder, a fixed housing extending from one end of said cylinder coaxial therewith, a control shaft within said cylinder and housing having a liquid inlet chamber positioned longitudinally within one end of said cylinder and a liquid outlet chamber positioned longitudinally within the other end of said cylinder and having ports, a liquid supply pipe from the outlet of said pump to said inlet chamber, a power shaft surrounding said supply pipe coaxial with said cylinder, a rotor column carried on said power shaft extending within said cylinder and surrounding said control shaft within the cylinder, a rotor blade carried on said rotor column extending between the heads of said cylinder and having its outer edge in contact with the inner surface of said cylinder, said rotor column having ports on each side of said blade adapted to align with the ports in said control shaft, a stator blade fixed within said cylinder extending between the heads of said cylinder and having one edge in contact with the outer surface of said rotor column, a lost motion clutch connecting said control shaft with said power shaft, said power shaft having a liquid discharge passage from said outlet chamber in communication with a pipe leading to said pump intake pipe, a worm gear mounted on said power shaft, a quadrant driven by said gear, a steering wheel operatively connected to said control shaft, and means for directing said vehicle actuated by said quadrant.

2. Steering mechanism comprising a control shaft, a power shaft, lost motion means of connection between said shafts, a power cylinder surrounding the adjacent ends of said shafts, a liquid circulating system including a pump and means for forcing liquid longitudinally of the two shafts into said cylinder, an oscillating piston on the power shaft within the cylinder, valve mechanism including parts carried by the control shaft and parts carried by the power shaft within the power cylinder for admitting liquid under pressure to the power cylinder on opposite sides of the piston depending upon the relative rotative positions of the control and power shafts.

3. Steering mechanism comprising a manually rotatable control shaft, a power shaft mounted in alignment with the control shaft, lost-motion means of connection between said shafts, a liquid pressure motor mounted on the adjacent ends of the shafts and including valve mechanism actuated by the control shaft, and a liquid supply pipe extending longitudinally through the power shaft to the motor.

4. Mechanism of the character described comprising a stationary cylinder having a longitudinal stationary abutment along one side of the cylinder, a control shaft extending into one end of the cylinder and having inlet and outlet valves communicating with said cylinder, a power shaft extending into the other end of the cylinder and having a lost-motion connection with the control shaft, a rotor blade secured to the power cylinder and adapted to oscillate in the cylinder, a liquid inlet pipe extending through the power shaft and communicating with the inlet valve in the control shaft, and an outlet conduit in the power shaft communicating with the outlet valve of the control shaft, the power shaft having valve passages coacting with the valves in the control shaft.

5. Steering mechanism comprising a stationary cylinder having a stationary abutment along one side thereof, coaxially arranged control and power shafts extending into said cylinder and having a lost-motion means of connection between said shafts, a radially projecting blade carried by the power shaft, said control shaft and said power shaft having telescoping portions with valve passages, and means for forcing liquid through one set of valve passages into said cylinder and from the other valve passages out of said cylinder, the valve passages in the power shaft being arranged on opposite sides of said blade.

WILLIAM O. TAIT, Jr.